United States Patent [19]

Kuhlmann et al.

[11] 4,340,831

[45] Jul. 20, 1982

[54] BRUSH HOLDER FOR FRACTIONAL HORSEPOWER MOTORS

[75] Inventors: Gerhard Kuhlmann, Stuttgart; Ernst Kränzler, Leinfelden-Echterdingen, both of Fed. Rep. of Germany; Gerhard Baer, Solothurn, Switzerland; Kurt Ruetsch, Riedholz, Switzerland; Hansruedi Ramseier, Zuchwil, Switzerland; Heinz Dubach, Lauterbach, Switzerland; Martin Lang, Biberist, Switzerland; Hans Schwartz, Günsberg, Switzerland; Hans Aebi, Derendingen, Switzerland

[73] Assignee: Robert Bosch GmbH, Stuttgart, Fed. Rep. of Germany

[21] Appl. No.: 54,781

[22] Filed: Jul. 5, 1979

[30] Foreign Application Priority Data

Jul. 20, 1978 [DE] Fed. Rep. of Germany ....... 2831928

[51] Int. Cl.³ .............................................. H02K 13/00

[52] U.S. Cl. ................................. 310/239; 310/68 R; 310/51; 310/71

[58] Field of Search ................... 310/239, 47, 240, 50, 310/241, 51, 242, 68 R, 245, 72, 246, 40 MM, 247, 71; 307/105

[56] References Cited

U.S. PATENT DOCUMENTS

| | | | |
|---|---|---|---|
| 1,706,255 | 3/1929 | Richard | 310/239 |
| 2,334,722 | 11/1943 | Mirick | 310/68 R |
| 2,947,895 | 8/1960 | Wray | 310/239 |
| 3,226,585 | 12/1965 | Roe | 310/239 |
| 3,441,766 | 4/1969 | Amrein | 310/239 |
| 3,842,302 | 10/1974 | Apostoleris | 310/242 |
| 3,867,659 | 2/1975 | Seaburg | 310/242 |
| 3,967,148 | 6/1976 | Walsh | 310/239 |
| 4,155,023 | 5/1979 | Hagenlocher | 310/51 |

*Primary Examiner*—R. Skudy

*Attorney, Agent, or Firm*—Frishauf, Holtz, Goodman & Woodward

[57] ABSTRACT

A brush holder mechanism for electric motors, especially the fractional horsepower commutator-equipped motors of workshop power tools. In order to prevent failure of the tool due to jamming of the carbon brushes in their holders, the brush holder according to the invention provides that the brush holder casing in which the carbon brush moves has smooth, flat and uninterrupted interior surfaces and the casing is constructed of a single piece of metal or a single piece of metal on which a continuous cover plate is attached. The integral construction of the casing insures that the casing is not deformed during manufacture or assembly, in particular by the bending of parts of the casing into fastening tabs and the like. In the brush holder according to the invention, the fastening means are integral with the cover plate or the casing. In other embodiments, the casing is held in a receiver by clamps and screws. The electrical connection between the brush and the electrical supply cable is made by plug-in components, for example a plug-in cover plate which also provides support for the brush spring. A number of embodiments is presented.

19 Claims, 10 Drawing Figures

BRUSH HOLDER FOR FRACTIONAL HORSEPOWER MOTORS

FIELD OF THE INVENTION

The invention relates to fractional horsepower motors, especially motors equipped with brushes and commutators for hand-held power tools. More particularly, the invention relates to a brush holder for holding and pressing the conducting brushes against the commutator of the motor. The commutator brushes are pressed against the commutator by a spring and are in electrical contact with the induction coils and other parts of the motor.

BACKGROUND AND STATE OF THE ART

Known fractional horsepower motors for hand-held power tools normally have brush holders that guide brushes which are pressed against the commutator by a spring supported on a cover at the end of the holder. The brush holder is positioned within the housing of the motor in a suitable frame. In a known brush holder used especially for home workshop power tools, the casing for the brush is made from a single strip of metal by suitably bending the casing walls so that one casing wall consists of only two lateral strips while its central portion is open. The support cover for the brush spring is formed in the aforementioned case by an upwardly bent tab. The walls of the casing have outwardly bent tongues which serve for connection of an electrical cable to the casing as well as the mechanical attachment thereto.

The casing is placed in its frame in a well-defined form-fitting position so that when the housing of the power tool is assembled, two fingers formed on the housing of the power tool engage the brush casing and fix its position within the casing enclosure. The two fingers of the housing make contact with the two lateral strips of the casing wall, each finger making contact with one of the lateral strips. The electrical current supply cable is provided with a noise suppression choke by soldering.

It is an unfortunate disadvantage of the known brush holder that the carbon brush is frequently jammed in its casing so that the brush spring is unable to press the carbon brush against the armature of the motor. The cause of the jamming may be, for example, incorrect assembly. For example, if the contacting and mounting tabs for the current supply cable are formed improperly, the casing may be deformed, thereby preventing the free motion of the brush. The formation of the support cover for the spring can also cause a deformation of the entire casing. Furthermore, the bending of the current supply tabs out of the surface of the casing wall may produce sharp edges which might intrude slightly into the interior of the casing and cause the carbon brush to jam.

Even when the brush casing and the manner of attaching the current cable are well within tolerances, it is still possible to cause a deformation of the casing by the support fingers of the housing of the tool. If the housing itself is not exactly within tolerances, the support fingers may deform the brush casing during assembly of the housing, thereby also engendering the jamming of the carbon brush.

Even after correct and careful assembly, it has been found that the carbon brush abruptly jams and can no longer be advanced by the spring in the direction of the commutator. The cause of the jamming is that the brush casing carries the electrical current and may be heated to high temperatures. During such heating, the two support fingers which are integral with the housing of the tool and are normally constructed of plastic are sintered slightly in the vicinity of the point of attachment to the sides of the brush casing. The very slight sintering suffices to cause the central part of the support finger to protrude through the open part of the casing toward the carbon brush. Thus the brush is forced against the aforementioned sharp edges on the tabs of the current supply cable, causing the brush to jam.

OBJECT AND SUMMARY OF THE INVENTION

It is a principal object of the present invention to provide a brush holder and brush holder-receiver assembly for commutator equipped motors in which the motion of the carbon brush is assured to be free under all normally occurring circumstances.

Briefly, according to the invention.

The brush holder has a brush holder casing having a smooth continuous internal surface so that the formation of sharp edges is prevented. The brush casing according to the invention does not involve the formation of bent-over tabs so that the casing cannot be deformed merely due to incorrect assembly. Furthermore, the construction of the brush casing according to the invention prevents any deformation by possible excessive dimensions of the support fingers of the tool housing. The aforementioned sintering of the support fingers after extended use of the machine is also prevented.

In an advantageous feature of the invention, the support cover for the brush spring serves at the same time as a plug-on receptacle for the electric supply. In another embodiment of the invention, the spring support cover has a snap-in connection with the remainder of the brush casing. The brush casing is made from a tube having a rectangular cross section. A radio noise suppression choke can easily be assembled close to and on the brush holder.

THE DRAWING

DESCRIPTION OF THE PREFERRED EMBODIMENTS

Figure 1:
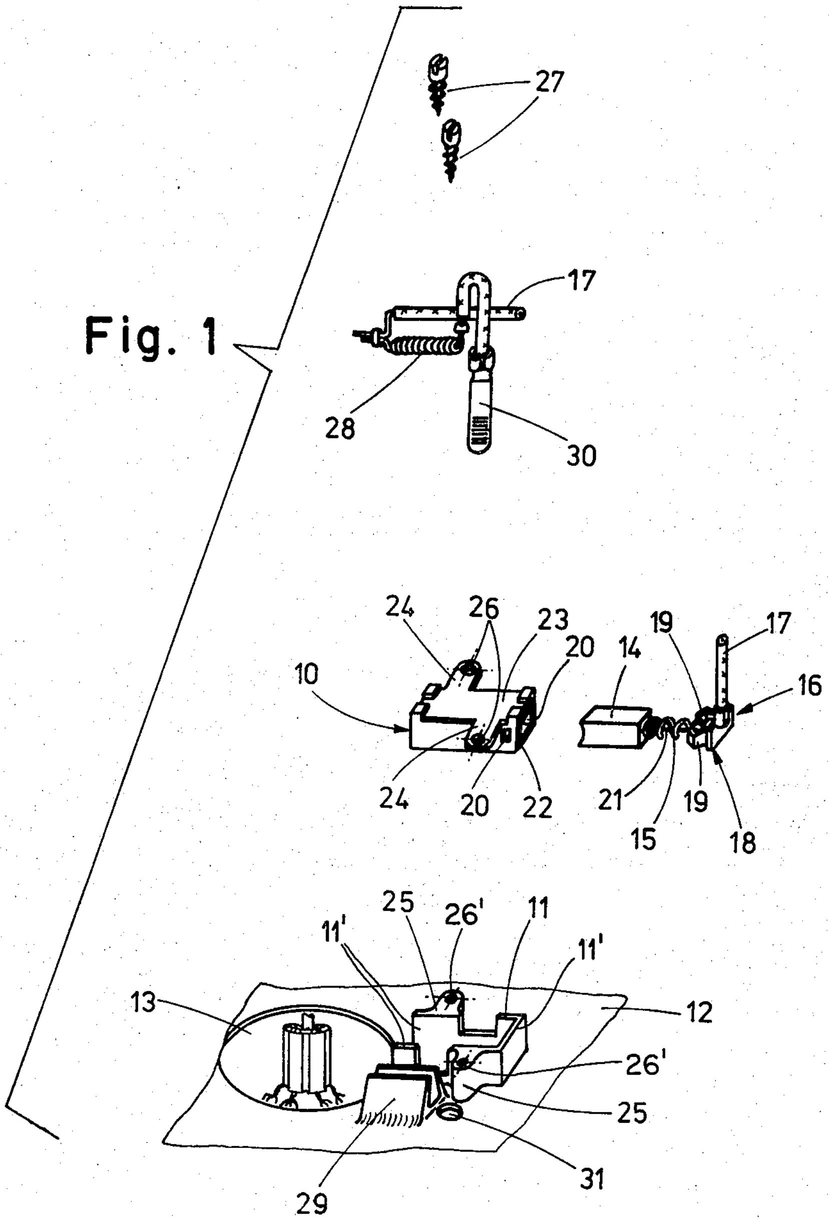
FIG. 1 is a perspective exploded view of a brush holder according to the invention in a first exemplary embodiment.

The first exemplary embodiment of the invention illustrated in FIG. 1 is a brush holder for a small fractional horsepower commutator-equipped motor especially for home power tools and includes a casing 10 which is received by a suitable casing receiver 11. The receiver 11 is advantageously integral with the preferably plastic housing 12 (shown only partially) of the home power tool. The plastic housing 12 has an opening 13 in the immediate vicinity of the receiver 11 through which a portion of the armature carrying the commutator protrudes (shown schematically, in fragmentary form only). The motor is so placed in the housing 12 of the power tool as to locate the commutator immediately in front of the brush casing receiver. A second identical brush holder (not shown) is located diametrically opposite the illustrated brush holder in known manner. Disposed within the casing 10 and axially displaceable therein is a carbon brush 14. The term "carbon brush" is intended to be generic and includes any suitable current-carrying brush regardless of the type of material of which it is made. The carbon brush 14 is urged against the surface of the commutator (not shown) by means of a brush spring 15 whose other end is supported on a support lid or plate 16 located at the end of the casing 10 remote from the commutator or the opening 13. Also provided is a current cable 17 attached to the carbon brush 14. The casing 10 is held in its receiver by means to be described below.

As illustrated, the casing 10 is closed on four major sides and the interior wall surfaces are smooth and flat in the vicinity of the normal motion of the carbon brush. The cover plate or lid 16 is a plug-in plate 18 which is seen in FIG. 1 to be permanently attached for electrical contact with the current cable 17. A plug-in connection holds the plug-in plate 18 releasably on the casing 10. Advantageously, the plug-in plate 18 is a snap-in element having two lateral protrusions 19 which engage two corresponding openings 20 in the sides of the casing 10 when the plate 18 is placed on the end of the casing 10. A flexible lead or pigtail 21 permanently connects the plug-in plate 18 with the carbon brush 14, the length of the lead or pigtail 21 being approximately equal to the length of the casing 10. This dimension makes it possible to use carbon brushes which do not have a non-conducting remainder because when the carbon brush is used up, the limited length of the flexible lead 21 prevents the remaining piece of the brush from moving toward the commutator. The omission of the non-conducting part of the brush makes it possible to use brushes of greater useful length, permitting a substantially extended operational time between brush changes.

In the embodiment illustrated in FIG. 1, the casing 10 is made of two parts. One part is the U-shaped part 22 formed by three walls of the casing and the second part is the fourth wall defined by the top plate 23. The aforementioned means for fastening the casing 10 in its receiver 11 are seen to be two tabs 24 which are part of the top plate 23 and which serve to attach the casing to the receiver by means of fastening screws 27 engaging top plate 23 into matching holes 26' in bosses 25 of holes 26 in the receiver. A noise suppression choke 28 is held rigidly in a holder 29 which forms a channel between upstanding side walls, and is placed in electrical series within the current supply cable 17. The choke holder 29 is part of the casing receiver 11.

The brush holder illustrated in FIG. 1 is assembled by placing the carbon brush 14 into the casing 10 and thereafter positioning the cover plate 18 at the end of the casing 10 by means of the protrusions 19 and the openings 20. The casing 10 is then placed in its receiver 11 between retaining wall portions 11'' and fastened therein by means of the screws 27 which tie down the tabs 24. The back wall 11' forms a retaining wall, i.e. a counter surface for plate 18 and hence spring 15. The bottom exterior wall of the casing 10 fits on the top surface of the receiver 11. Thereafter, the noise suppression choke is placed in its holder 29. The end of the current supply cable 17 is embodied as a plug 30 which is passed through a suitable hole 31 in the housing 12 and is attached to the appropriate electrical connection.

Figure 2:
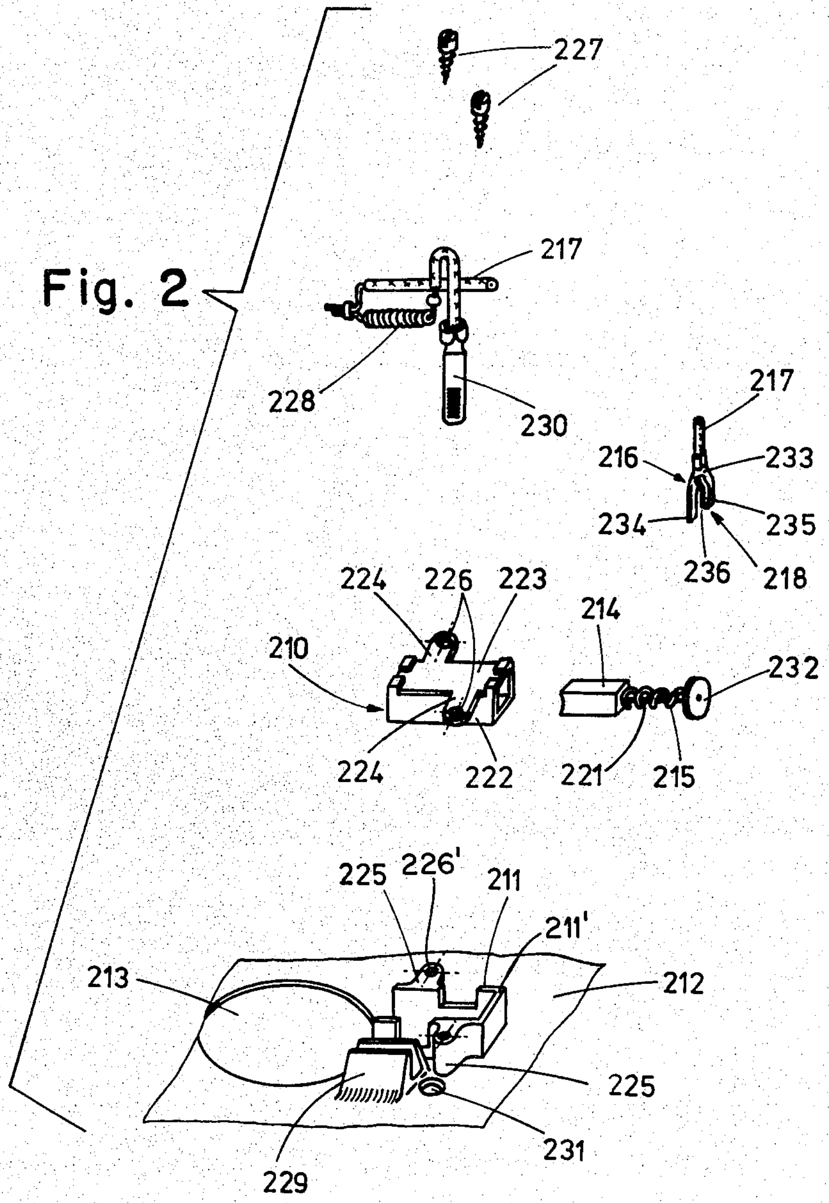
FIG. 2 is an illustration of a brush holder according to a second exemplary embodiment.

Embodiment of the invention is illustrated in FIG. 2. A substantial number of parts is identical with those of the embodiment of FIG. 1 and the reference numberals of these parts are the same as in FIG. 1 except for being increased by the number 200.

The plug-in plate 218 is held on an end plate 232 attached to the brush 214. The end plate 232 in turn is connected via a flexible lead 221 to the brush 214. A brush spring 215 is placed between the brush 214 and the end plate 232.

In the embodiment of FIG. 2, the plate 218 is a plug 233 which has a substantially U-shaped cross section seen in the direction of the plug-in motion. The end plate 232 is clamped between the legs 234 and 235 of the plug 233. The leg 234 has a recess permitting the passage of the flexible lead 221. The plug 233 may be simply constructed by punching the bent-over leg 235 out of the plate 218 and bending it to form the recess 236 so that the leg 235 will be deformed out of the plane of the sheet metal element. The length of the flexible lead 221 is approximately equal to that of the casing 10, thereby obtaining the advantage of the increased useful length of the brush as described with reference to FIG. 1.

The brush holder according to FIG. 2 is assembled as follows. In a first step, the plug 233 is pushed on the end plate 232. Thereafter, the brush 214 is inserted in the casing 210. The casing 210 prepared in this manner is placed in its receiver 211 by a compression of the spring 215, whereafter it is permanently attached by insertion of the screws 227 through the tabs 224 in the receiving holes 226' of bosses 225. The plug 233 is supported at the end wall 211' of the receiver 211 which then will be the support or counter element for spring 215 and the retaining wall for the casing 210. When the plug 233 is pushed onto the end plate 232, the spring 215 must be lifted slightly from the end plate 232 to permit the insertion of the plug 233. After the plug 233 has been emplaced, the spring 215 resides on the leg 234 of the plug 233.

Figure 3:
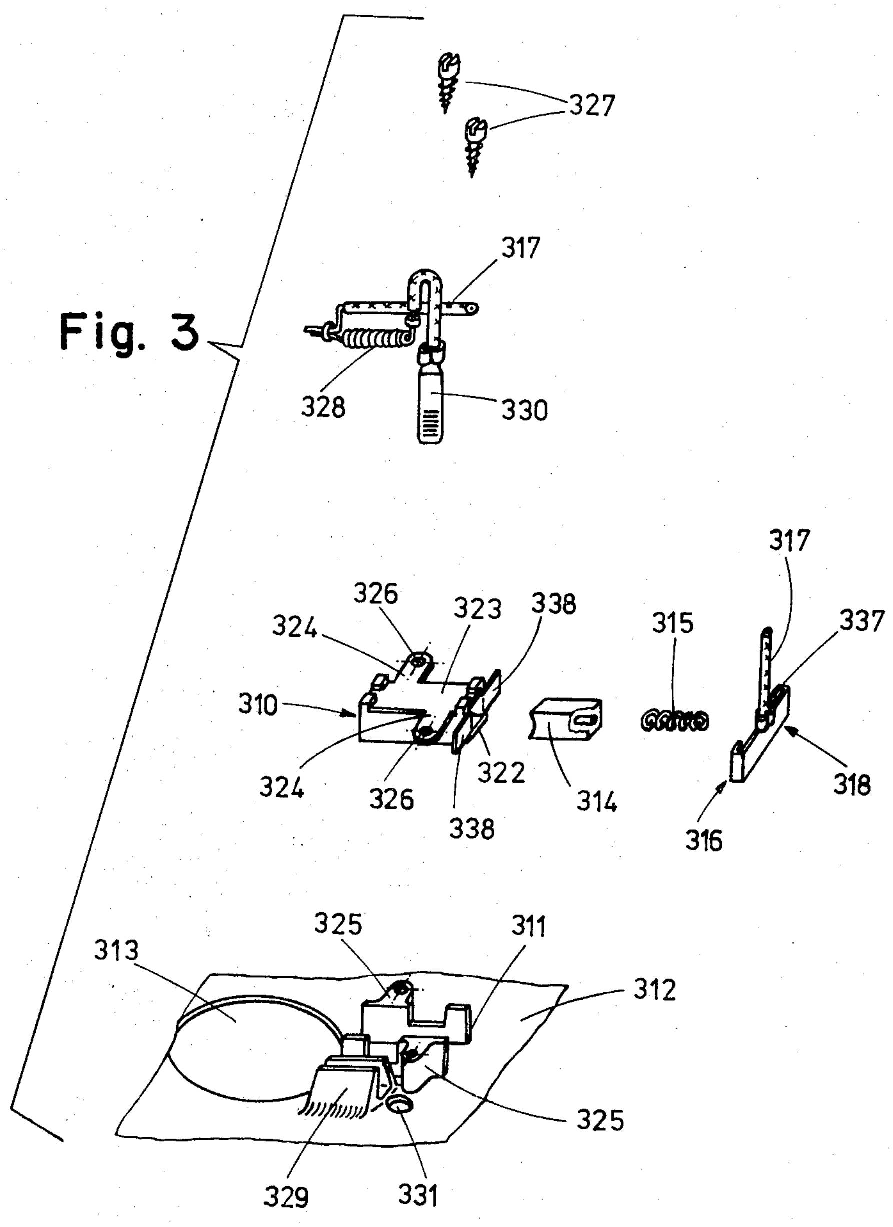
FIG. 3 is an illustration of a brush holder according to a third exemplary embodiment.

Embodiment of FIG. 3 in which the reference numbers are increased by 300 with respect to the illustration of FIG. 1; The plug-in plate 318 is a plug 337 with an approximately C-shaped cross section. The end face of the casing 310 has two opposite tabs 338 on which the plug 337 may be placed. The plate 318 is connected directly to the casing 310. In this embodiment, the carbon brush 314 is not connected to the plug 318 by a flexible lead but is loosely inserted into the casing 310. When assembled, the brush 314 and the brush spring 315 are held between the commutator and the plug 318. However, it is also possible to connect the brush 314 to the plug 337 by means of a flexible lead similar to the embodiment of FIG. 1.

Figure 4:
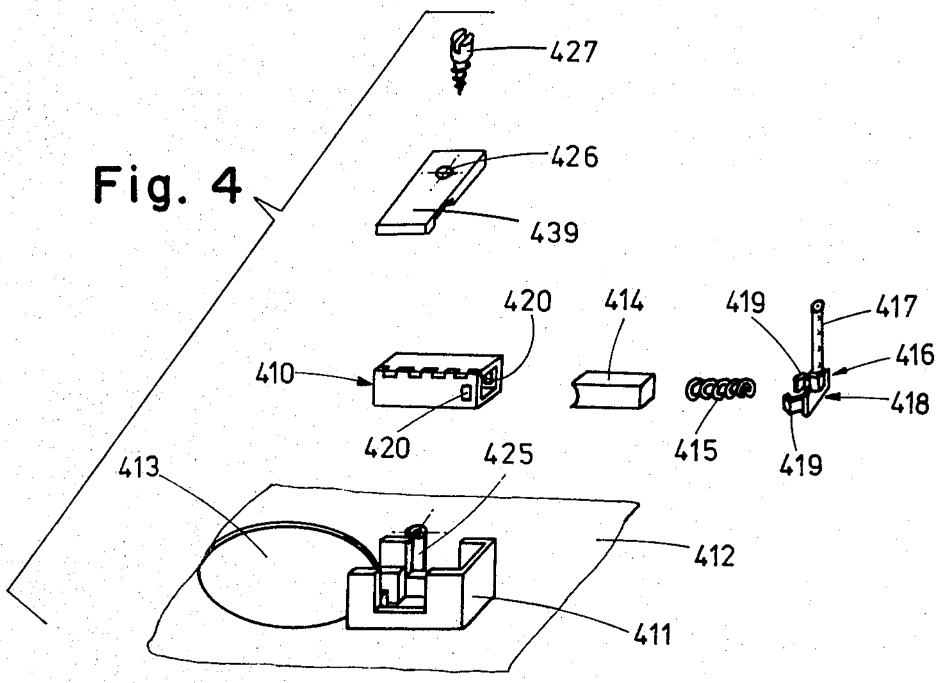
FIG. 4 is an illustration of a brush holder according to a fourth exemplary embodiment.
Figure 5:
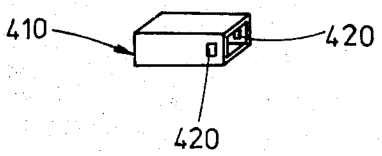
FIG. 5 is a variant of the brush holder according to FIG. 4.

The embodiment according to FIG. 4 is also very similar to that of FIG. 1. The reference numerals in this embodiment have been increased by the number 400 with respect to FIG. 1. Thus the brush 414 is axially movable in a casing 410 which is placed in a receiver 411. The receiver 411 is attached to a part of the housing 412 and the commutator passes through an opening 413. The casing 410 is closed on all major sides and has a smooth and flat interior to permit the unimpeded passage of the brush 414. The cover plate 416 is again embodied as a plug 418 which has a snap-in element for engagement with the casing 410 including two lateral protrusions 419 which come to rest in corresponding openings 420 of the casing 410. A current supply cable 417 is attached to the plate 418. The plate 418, the brush 414 and the brush spring 415 are all separate elements which are held in the correct position after assembly and placement of the plug 418; however, the brush 414 may also be connected to the plug 418 by a permanently attached flexible lead. In the embodiment of FIG. 4, the casing 410 is of one piece bent from a single flat strip of metal. The two cooperating edges of the side wall may be serrated as shown. However the casing 410 may also be a tube of rectangular or square cross section as illustrated in FIG. 5. In either case, the internal surface of the casing will be smooth and flat and uninterrupted. In this embodiment, the casing 410 is held in the receiver 411 by means of a clamp 439 which has a hole 426 through which a mounting screw 427 can pass for engagement with a screw hole in a boss 425 in the receiver 411.

In all of the embodiments illustrated in FIGS. 1–5, the end plate is a plug-in plate which serves as a support for the brush spring and which also constitutes the electrical connection between the electrical supply cable and the carbon brush. Accordingly, it is not necessary to provide separate connecting tabs for attaching the current-carrying cable. The absence of these tabs makes it unnecessary to perform separate steps during the assembly, for example the bending of tabs or the like. This fact prevents unintended deformation of the casing during assembly and also makes possible an uninterrupted internal guide surface of the casing for guiding the motion of the brush. The casing is attached in its receiver by directly-acting fastening means, for example screws and mounting tabs or by a clamp which is separate from the casing. The presence of these elements makes it unnecessary to hold the brush casing in place by support fingers which are part of the housing of the power tool. The absence of such support fingers also makes the housing of the power tool simpler and any variations in the dimensions of the housing during the manufacture thereof cannot cause a deformation of the brush casing or prevent the assembly of the housing.

Figure 6:
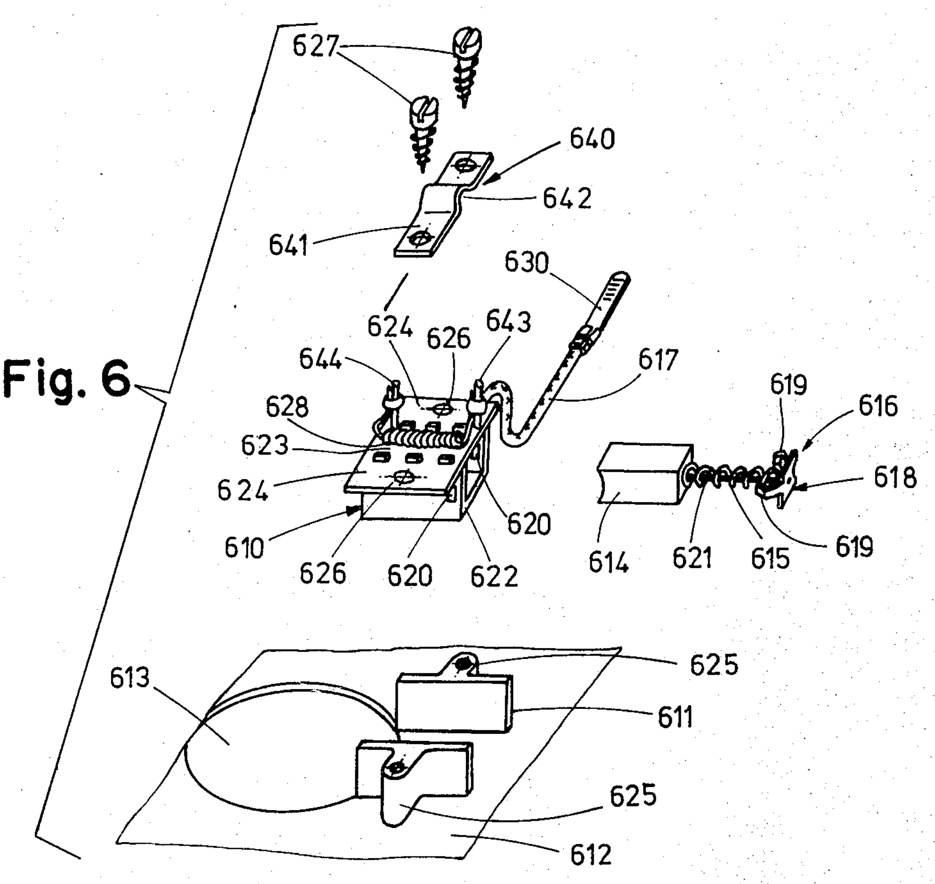
FIG. 6 is an illustration of a brush holder according to a fifth exemplary embodiment.

A substantially variant embodiment of the invention is illustrated in FIG. 6 in which parts similar or identical to those already illustrated in FIG. 1 have reference numerals increased by the number 600. The brush holder illustrated in FIG. 6 has a receiver 611 disposed directly on the housing 612 in the vicinity of the opening 613 through which the commutator extends. The casing 610 is made of two parts, a first part which forms three walls of the casing 622 and a cover plate 623 constitutes the fourth wall of the casing 610. The cover plate 623 is made of a non-flammable insulating material, for example ceramic, vitrified paper, or the like. The cover plate 623 and the U-shaped part 622 together constitute a flat and internally smooth-walled casing 610 which is everywhere closed except at the ends. The cover plate 616 which closes the end of the casing 610 is again embodied as a plug 618 having a snap-in element similar to that illustrated in FIG. 1. The snap-in element consists of the protrusions 619 which engage openings 620 in the U-shaped portion 622 of the casing 610. A brush 614 is connected by a flexible lead 621 to the plug 618 and its length is so chosen as to be approximately equal to the length of the casing 610. However, the brush 614, the spring 615 and the plug 618 could also be embodied as separate parts, similar to the embodiment of FIGS. 3 or 4 which are only oriented and properly disposed during assembly of the brush holder.

Attached to the cover plate 623 of the casing 610 is a holder 640 in which a choke 628 connected in series with the current supply cable 617 may be placed. In the embodiment of FIG. 6, the holder 640 is formed by a mounting clamp 641 which has a bulge 642 that engages the choke 628. The clamp 641 is attached to the housing by screws 627 which pass through holes 626 in mounting tabs 624 and engage suitable holes in bosses 625 on the housing 612. When assembled, the casing 610 is immovably located within the receiver 611. The cover plate 623 and the two mounting tabs 624 are so constructed as to hold the casing 610 at some distance from the walls of the receiver 611. Accordingly, the current-carrying U-shaped part 622 is also placed at some distance from the walls of the receiver 611. Furthermore, the cover plate 623 is made of a non-flammable insulating material so that in the construction of FIG. 6, no current-carrying or heated parts of the brush holder ever make area contact with the receiver 611. For this reason, the receiver which is advantageously integral with the housing need not be constructed of a non-flammable insulating material but may be any inexpensive insulating material normally employed for constructing the housing of the power tool. The clamp 641 which holds the choke 628 is attached to the mounting bosses or posts 625 together with the cover plate 623 and may also advantageously be made of a non-flammable insulating material.

The cover plate 623 has a first connecting pin 643 while a second connecting pin 644 extends from the current-carrying U-shaped part 622 of the casing 610. The latter pin 644 extends through the insulating cover plate 623. The choke 628 is connected to the two pins 643 and 644. The current-carrying cable 617 is connected to the first connecting pin 643. The aforementioned construction provides a very inexpensive but satisfactory contact as between the current supply cable 617 and the noise-suppressing choke 628 on the one hand, as well as between the choke 628 and the casing 610 on the other hand. At the same time, the holder 640 holds the choke 628 rigidly and vibration-free against the brush holder. In this embodiment, the plate 618 which has a snap-in element only serves to support the spring 615 but no longer serves as a cable connector supplying current to the brush 614.

Figure 7:
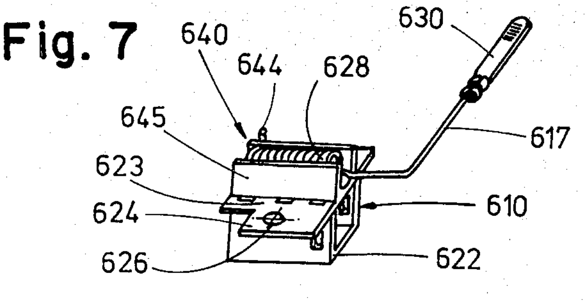
FIG. 7 illustrates a variant of the casing of the brush holder of FIG. 6.

A variant of the embodiment of FIG. 6 is illustrated in FIG. 7 which illustrates a different construction of the holder 640 for the choke 628. In this variant, the holder 640 is formed by a U-shaped bracket 645 which is part of the top of the cover plate 623'. The choke 628 may simply be pressed into the bracket 645 and is thus held in a vibration-free manner. In other respects, the cover plate 623' is similar to the plate 623 of FIG. 6. As in FIG. 6, it is attached by means of tabs 624 to the receiver 611.

Figure 8:
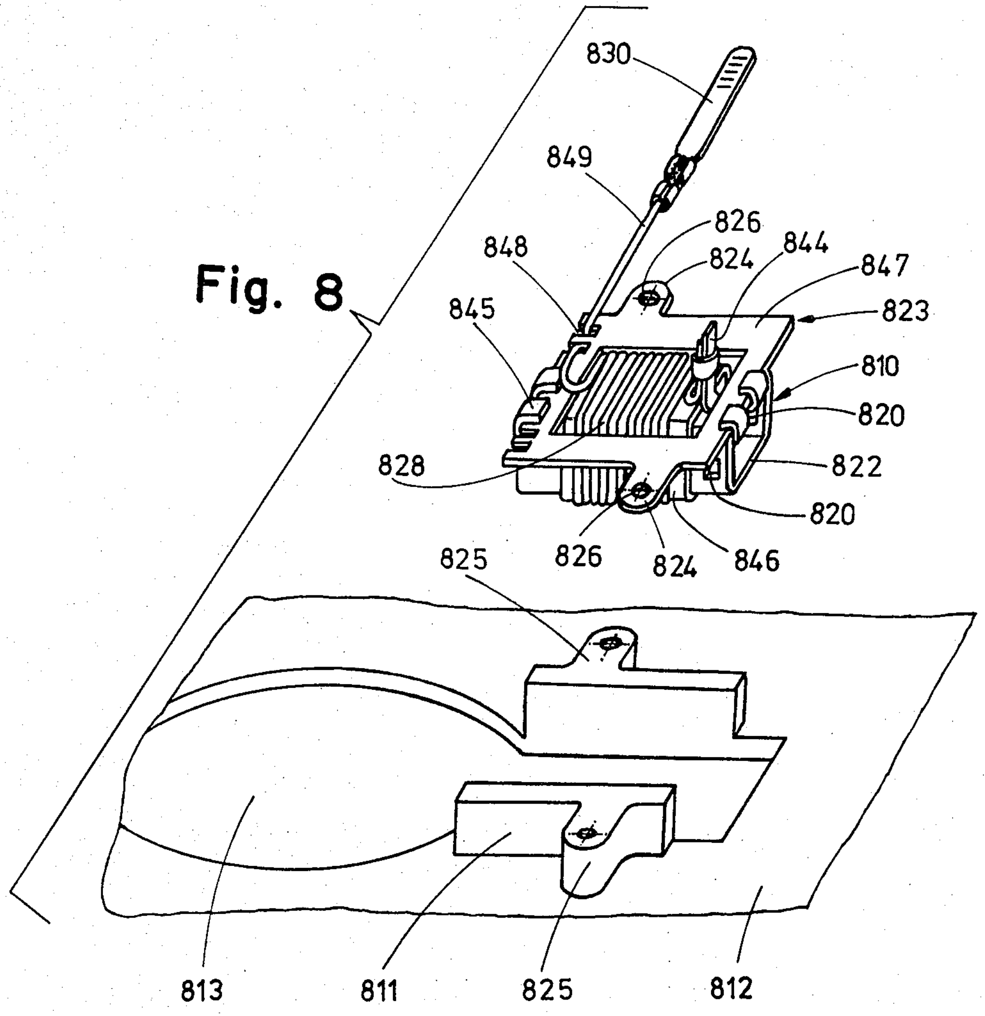
FIG. 8 is an illustration of a brush holder according to a sixth exemplary embodiment.
Figure 9:
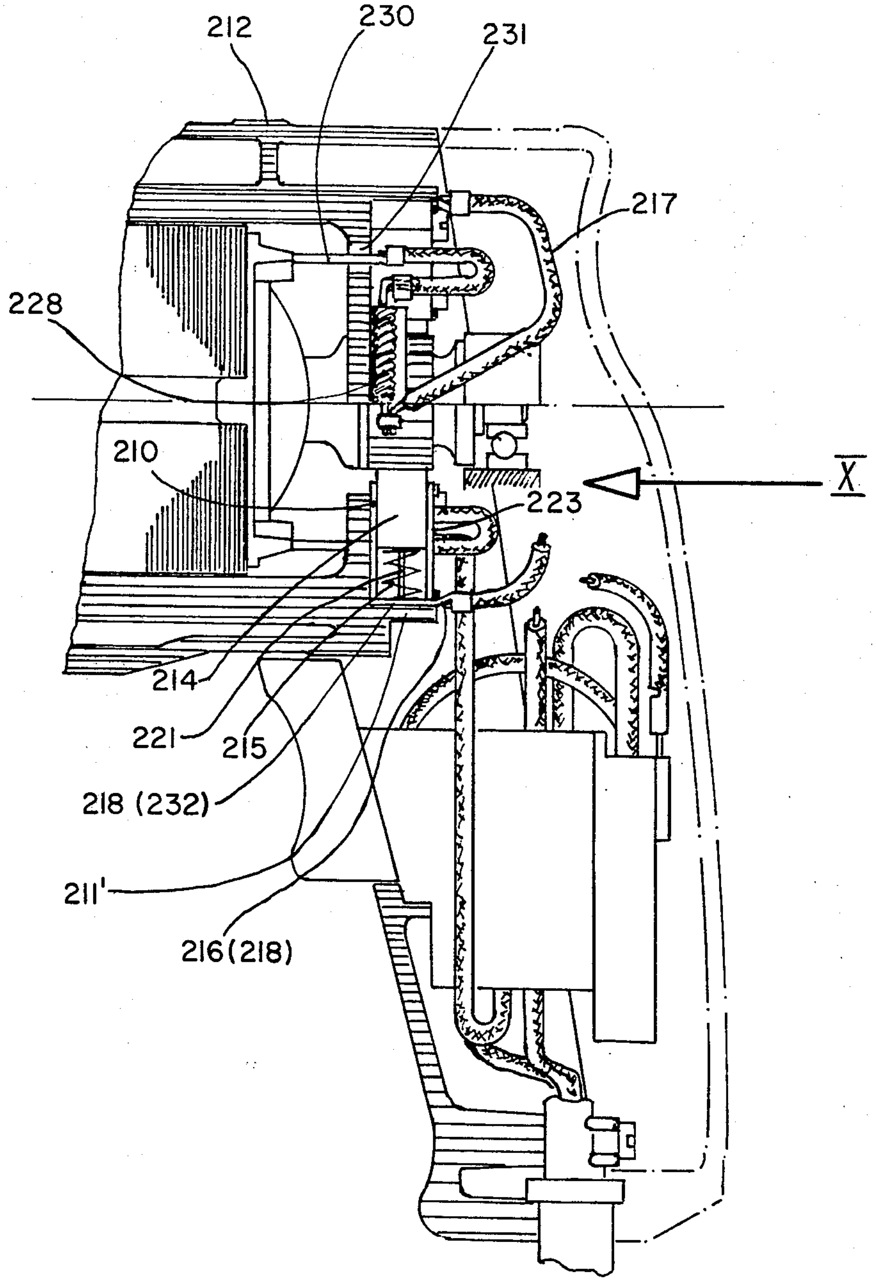
FIG. 9 is a part-sectional side view of the brush holder of FIG. 2 installed in a hand drill, the section being along line IX—IX of FIG. 10.
Figure 10:
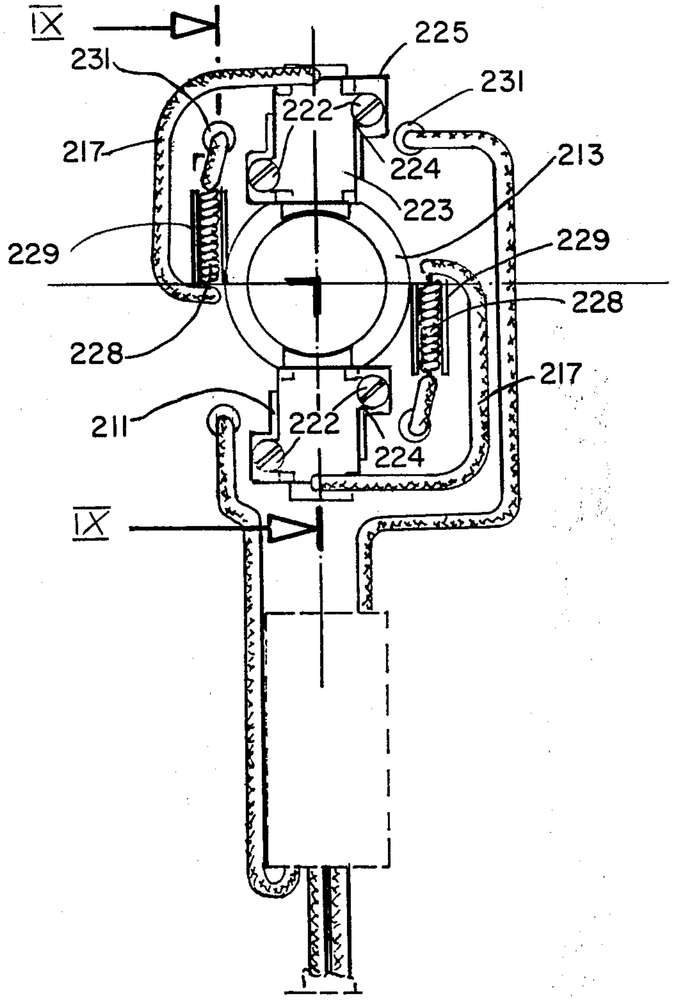
FIG. 10 is an end view looking in the direction of arrow X.

Still another embodiment of the invention is illustrated in FIG. 8. Parts of the embodiment of FIG. 8 which are similar or identical to those of FIG. 1 carry the same reference numerals increased by the number 800. The embodiment of FIG. 8 has a fully closed and inwardly smooth and flat casing 810 placed in a receiver 811, having bosses 825, which is part of the housing 812 of the tool. The housing 812 has an opening 813 permitting the passage of the commutator. In FIG. 8, the brush, the brush spring and the support plate for the spring have been omitted for the sake of clarity. However, the support plate may be a plug-in plate similar to that of the illustration of FIG. 6 having protrusions which engage openings 820 in the casing 810. In this embodiment, the U-shaped part 822 of the casing 810 carries a soft iron sleeve 846 which constitutes the core of the choke 828. The coil wire of the choke 828 is wound around the soft iron sleeve 846 and thus also surrounds the casing 810. The cover plate 823 which is rigidly attached to the U-shaped part 822 of the casing 810, for example by clasps 845, is an insulating frame 847 whose dimensions are such as to enclose the soft iron sleeve 846 and the coil of the choke 828. The U-shaped part 818, the soft iron sleeve 846 and the frame 847 close the casing 810 on all major sides and provide a smooth and flat internal surface for the movement of the brush therein.

The insulating frame 847 has two oppositely disposed fastening tabs 824 each of which has a bore 826 permitting the passage of mounting screws, not shown. The form of the tabs 824 is such as to hold the casing 810 at some distance from the walls of the receiver 811. One of the ends of the coil wire of the choke 828 serves as the current supply cable for the brush and has a contact pin 830. This end of the coil is held in recesses 848 of the frame 847. The other end of the coil of the choke 828 is attached to the pin 844 which is integral with the U-shaped part 822 of the casing 810.

The embodiment of FIG. 8 shares the advantage of the embodiment of FIG. 6, namely that the casing 810, the cover plate 823 and the choke 828 may be preassembled ready for installation in the housing of the tool after the insertion of the carbon brush. Any voltage or current-carrying parts which may be heated in the operation of the tool are separated from any flammable materials in the casing receiver. Furthermore, the embodiment of FIG. 8 shares all the advantages of the previously described brush holders.

The foregoing description relates to preferred exemplary embodiments of the invention, it being understood that any features of one embodiment may be used with those of any other without departing from the scope of the invention.

We claim:

1. Brush holder-receiver assembly for fractional horse power, commutator-type electric motor having
- a brush holder casing;
- a conductive brush movably retained in the casing;
- a spiral brush spring engaging the brush at one end thereof and biasing the brush;

wherein
- the brush casing defines an open tube which, in cross section, is essentially rectangular and has four smooth, continuous, uninterrupted walls forming smooth, uninterrupted interior surfaces;

and comprising
- a support plate engaged by and supporting the spring at its other end, and forming a combined support and electrical connecting plate;
- a pigtail positioned within the spring and flexibly electrically connecting the brush and said connecting support plate and having a length which is of limited length to prevent escape of the brush from the casing after wear of the brush;
- a push-on connector electrically and mechanically engaged with the support plate and connected to an electrical connection cable;
- a receiver for the brush holder casing to hold and orient the brush holder casing in the motor;
- and means securing the brush holder casing to the receiver including
- a support surface formed on the receiver fitting against an exterior support surface on said casing;
- spaced sidewalls projecting from said support surface and fitting against exterior lateral surfaces of said brush holder casing;
- and a retaining wall extending transversely with respect to said side walls, said retaining wall being formed on the receiver located in alignment with the brush holder casing and positioned to provide a stop for said combined support and electrical connecting plate and the push-on connector, and forming a counter element for said brush spring.

2. Holder according to claim 1, wherein the side walls of the receiver include a pair of projecting bosses;
- attaching means are provided secured to the top surface of the casing and over-lapping at least one of the bosses;
- and the securing means comprising at least one attachment screw passing through said overlapping attachment means and into at least one of the bosses.

3. Holder according to claim 1, wherein said push-on connector comprises a sliding female plug of substantially U-shaped cross section-when looked at in the direction of sliding movement-and wherein said support plate is clamped between the legs of said U-shaped connector.

4. Holder according to claim 3, wherein one of the legs of said U-shaped connector is formed with a recess permitting passage of said pigtail therethrough.

5. Holder according to claim 4, wherein said push-on connector comprises a sheet metal element, one of the legs of said U-shaped connector being deformed out of the plane of said sheet metal element, the remainder of the sheet metal element defining the second leg and leaving the recess formed by deformation out said first leg.

6. Holder according to claim 2, wherein said attaching means comprises laterally extending projecting portions formed on the top surface of said casing and projecting over said bosses.

7. Holder according to claim 1, wherein the length of said pigtail is approximately equal to the length of said casing.

8. Holder according to claim 1, further including a noise suppression choke, electrically serially connected to the brush;
- wherein said casing is a two-element structure, the first of said elements being a U-shaped part defining three continuous side walls of said casing, and said second element being a cover plate defining the fourth wall of said casing;

said cover plate being made of non-flammable electrically insulating material;

said cover plate defining a holder receiving the noise suppression choke.

9. Holder according to claim 8, wherein said noise suppression receiving choke holder comprises a bracket secured to said cover plate and formed with a cavity region to receive said choke, said bracket being secured to said receiver.

10. Holder according to claim 8, further comprising first and second connecting pins secured to said cover plate;

the terminal ends of the choke being connected, respectively, to said connecting pins;

and a current supply cable connected to one of said connecting pins, the support plate being electrically connected to the other of the connecting pins to place the choke serially in circuit between the brush and the cable.

11. Holder according to claim 1, further including a noise suppression choke, electrically serially connected to the brush;

wherein said receiver is formed with means for defining a channel, said noise suppression choke being positioned within said channel.

12. Holder according to claim 1, wherein said receiver is formed with a pair of projecting upstanding side walls to define a channel therebetween and forming part of the receiver, and further including a noise suppression choke, electrically, serially connected to the brush, said choke being placed in said channel between the upstanding side walls.

13. Brush holder for a fractional horse power, commutator-type electric motor having a brush holder casing;

a conductive brush movably retained in the casing;

a spiral brush spring engaging the brush at one end thereof and biassing the brush;

a receiver for the casing to hold and orient the brush holder casing in the motor;

means securing the brush holder casing to the receiver;

and a noise suppression choke, electrically serially connected to the brush, wherein said casing is a two-element structure, the first of said elements being a U-shaped part defining three continuous side walls of said casing, and said second element being a cover plate defining the fourth wall of said casing;

said cover plate being made of non-flammable electrically insulating material;

said cover plate defining a holder receiving the noise suppression choke.

14. Holder according to claim 13, wherein said noise suppression receiving choke holder comprises a bracket secured to said cover plate and formed with a cavity region to receive said choke, said bracket being secured to said receiver.

15. Holder according to claim 13, wherein the receiver has a pair of projecting bosses, the outer surfaces of the brush holder casing fitting within the bosses;

means engaging said cover plate and overlapping at least one of the bosses;

and wherein said securing means comprises at least one attachment screw passing through said overlapping engagement means and into at least one of the bosses.

16. Holder according to claim 15, wherein said overlapping engagement means comprises a clamping bracket secured to at least one of the bosses and overlapping the top cover plate.

17. Holder according to claim 15, wherein said overlapping engagement means comprises lateral tabs formed on the cover plate.

18. Holder according to claim 17, wherein said bosses have a clear spacing wider than the casing to provide for clearance between said casing and said bosses upon attachment of the tabs on the cover plate to said bosses by said securing means.

19. Holder according to claim 13, further comprising first and second connecting pins secured to said cover plate;

the terminal ends of the choke being connected, respectively, to said connecting pins;

and a current supply cable connected to one of said connecting pins, the support plate being electrically connected to the other of the connecting pins to place the choke serially in circuit between the brush and the cable.

* * * * *

UNITED STATES PATENT AND TRADEMARK OFFICE
CERTIFICATE OF CORRECTION

PATENT NO. : 4,340,831

DATED : July 20, 1982

INVENTOR(S) : Gerhard KUHLMANN

It is certified that error appears in the above—identified patent and that said Letters Patent is hereby corrected as shown below:

In the specification, Col. 3, lines 62,63,64, change to read:

> "the receiver by means of fastening screws 27 engaging through holes 26 in the top plate 23 into matching holes 26' in bosses 25 of the receiver. A noise suppression choke 28 is held."

Col. 4, line 16, change to read: "Embodiment of Fig.2: ".

Col. 6, line 38, delete "mounting";
, line 39, before "posts" insert -- mounting --.

Signed and Sealed this

*Thirtieth* Day of *November 1982*

[SEAL]

*Attest:*

GERALD J. MOSSINGHOFF

*Attesting Officer* *Commissioner of Patents and Trademarks*